United States Patent [19]

Bronstert

[11] Patent Number: 4,753,991

[45] Date of Patent: Jun. 28, 1988

[54] POLYMERS CONTAINING AMINO GROUPS, AND THEIR PREPARATION

[75] Inventor: Klaus Bronstert, Carlsberg, Fed. Rep. of Germany

[73] Assignee: BASF Aktiengesellschaft, Fed. Rep. of Germany

[21] Appl. No.: 889,372

[22] Filed: Jul. 25, 1986

[51] Int. Cl.$^4$ .............................................. C08F 8/32
[52] U.S. Cl. .................... 525/98; 525/332.9; 525/333.2; 525/333.6; 525/375; 525/382
[58] Field of Search ............... 525/98, 332.9, 333.2, 525/333.6

[56] References Cited

U.S. PATENT DOCUMENTS

| | | | |
|---|---|---|---|
| 3,781,260 | 12/1973 | Halasa | 260/30.1 R |
| 3,862,107 | 1/1975 | MacLeay | 525/376 |
| 3,890,294 | 6/1975 | Sheppard et al. | 525/333.2 |
| 3,907,925 | 9/1975 | Cowell et al. | 525/332.5 |
| 3,976,628 | 8/1976 | Halasa et al. | 526/176 |
| 3,976,723 | 8/1976 | Williams et al. | 525/339 |
| 4,015,061 | 3/1977 | Schulz et al. | 526/176 |
| 4,038,469 | 7/1977 | Walker et al. | 525/332.2 |
| 4,076,913 | 2/1978 | Walker et al. | 525/332.2 |
| 4,111,856 | 9/1978 | Haag et al. | 525/332.2 |
| 4,245,064 | 1/1981 | Drobnik et al. | 525/359.4 |
| 4,299,932 | 11/1981 | Hergenrother et al. | 525/333.1 |
| 4,461,876 | 7/1984 | Lieberman et al. | 525/333.3 |
| 4,478,984 | 10/1984 | Bryan | 525/333.2 |

FOREIGN PATENT DOCUMENTS 1444680 4/1974 United Kingdom .

*Primary Examiner*—Joseph L. Schofer
*Assistant Examiner*—Bernard Lipman
*Attorney, Agent, or Firm*—Keil & Weinkauf

[57] ABSTRACT

Homopolymers, copolymers and/or block copolymers which are obtained from vinylaromatics and/or dienes, are modified with functional amino groups and contain functional groups of the formula (I) or (II)

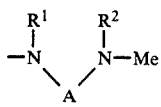

(I)

or

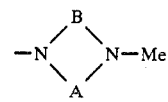 (II)

where N is nitrogen, $R^1$ and $R^2$ are each alkyl or aryl, A is an unsubstituted or substituted one-membered carbon bridge, Me is an alkali metal and B is a 2-membered to 12-membered carbon bridge in which at least the members adjacent to the nitrogen atoms consists of —C($R^3$,$R^4$) radicals, where $R^3$ and $R^4$ can be identical or different and are each hydrogen, alkyl, cycloalkyl or aryl, and the more remote members can be not only —C($R^3R^4$) radicals but also ether or N-alkyl- or N-arylimino groups, a process for the preparation of the polymers from the corresponding living anionically polymerized polymers, or polymers metallized with an alkali metal, and the coresponding hydrazine derivatives, and the use of the polymers for the preparation of similar polymers possessing functional groups of the general formula (V) or (VI)

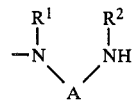

(V)

or

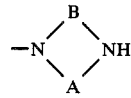 (VI)

by reaction with an equivalent amount of water, or of similar polymers possessing the functional groups of the general formula (VII) or (VIII)

$$-\overset{R^1}{\underset{|}{N}}H$$  (VII)

or

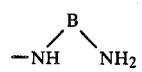 (VIII)

by reaction with an excess of water.

6 Claims, No Drawings

POLYMERS CONTAINING AMINO GROUPS, AND THEIR PREPARATION

The present invention relates to homopolymers, copolymers and/or block copolymers which are modified with aminofunctional groups and obtained from vinyl aromatics and/or dienes, their preparation from living anionically polymerized homopolymers, copolymers and/or block copolymers of vinyl aromatics and/or dienes or from polymers of this type which have been metallized with an alkali metal, and their use for the preparation of similar polymers by reaction with water.

Polymers of this type are high molecular weight compounds having molecular weights $\overline{M}_w$ of from 500 to 500,000 and containing functional groups and/or terminal groups randomly distributed over the polymer molecules and/or at the chain ends.

Polymers obtained from vinyl aromatics and/or dienes and modified with functional groups, and their preparation from the corresponding living, anionically polymerized polymers or from the polymers metallized with an alkali metal have long been known. For example, polymers containing secondary amino groups can be obtained according to German Laid-Open Application DOS No. 2,003,128 by a method in which high molecular weight organo-alkali metal compounds are reacted with N-alkyllactams. In a known process for the preparation of polymeric compounds containing any desired number of functional groups, polymeric, polyfunctional organo-alkali metal compounds are reacted with reactive, low molecular weight compounds, such as carbon dioxide, carbon disulfide, halogen-substituted amines, alkylene oxides or aliphatic halohydrocarbons (cf. U.S. Pat. No. 3,951,931). Processes for metallizing unsaturated polymers and reacting the resulting metallized polymer with reactive chemical compounds are also described in U.S. Pat. Nos. 3,781,260 and 3,976,628. FR-A-2 437 417 discloses a process for metallizing certain ethylene terpolymers and reacting the product with an aliphatic lactam, copolymers modified with functional groups being obtained. British Pat. Nos. 1,173,508 and 2,138,005 too, describe polymers, in particular diene polymers, which are modified with functional groups and are formed by reacting the corresponding alkali metal diene polymers with aliphatic tertiary amines or complexes of tertiary amines with sulfur trioxide. Finally, U.S. Pat. No. 4,015,061 discloses polymers which possess terminal bistrialkylsilylamino groups, are obtained from the corresponding metallized polymers and silicon-amino compounds and can be converted to the corresponding amine-substituted polymers by reaction with water. The synthesis of polymers containing primary amino terminal groups by reacting living anionic polymers with protected aminating reagents, such as trimethylsilylbromoethylamine, is described by A. Hirao et al. in Makromol. Chem., Rapid Commun. 3 (1982), 59-63.

The disadvantage of the known processes for introducing amino groups into polymers is that these processes frequently take place with moderate yield, so that the reaction products contain large amounts of inert, high molecular weight polymers formed as a result of side reactions. Furthermore, the amine-modified polymers are not obtained in one step. The polymers possessing terminal amino groups have to be liberated from initially formed intermediates by expensive reactions and purification steps.

It is an object of the present invention to provide polymers of vinylaromatics and/or dienes in a reaction which takes place in one way and with high conversion, the resulting polymers possessing one or more amino groups or terminal groups. It is a further object of the present invention to provide polymers of vinylaromatics and/or dienes, which polymers are modified with functional amino groups and are contaminated only slightly, if at all, by inert by-products or by the reactive low molecular weight compounds. It is a further object of the present invention to obtain polymers possessing amino groups by a simple method.

We have found that these objects are achieved by polymers according to claims 1 to 5 and 7 and 8, by a process for the preparation of the polymers according to claim 6 and by the use of the polymers according to claim 1 for the preparation of polymers according to claims 7 and 8.

Polymers modified with functional amino groups are those which contain the functional groups (I), (II) and (V) to (VIII), both randomly distributed in the chain and at the chain ends of a macromolecule. The polymers preferably possess 1 to 10 functional groups per macro-molecule, depending entirely on the number of living anionic chain ends or metallized groups used.

Homopolymers, copolymers and block copolymers of vinylaromatics and/or dienes are the known polymers of this type which can be obtained from the corresponding monomers by anionic polymerization, for example with the aid of organo-alkali metal initiators. Processes of this type are sufficiently well known to make further discussion here unnecessary (cf. for example British Pat. No. 1,444,680 or J. Appl. Polym. Sci. 22 (1978), 2007-2913).

Particularly suitable vinylaromatics are styrene, the various alkylstyrenes and vinylnaphthalene, while suitable dienes are butadiene, isoprene, 2,3-dimethylbutadiene, piperylene, phenylbutadiene and other anionically polymerizable conjugated $C_4$-$C_{12}$-dienes. In addition to the homopolymers, the copolymers and the known block copolymers of vinylaromatics and dienes are also suitable, and block copolymers or copolymers having a random distribution of the monomers can be obtained, depending on the choice of initiator and solvent.

The polymers generally have a mean molecular weight (weight average $\overline{M}_w$) of from 500 to 500,000, determined by gel permeation chromatography (GPC) and comparison with standardized polymers suitable for calibration (cf. G. Glöckner, Polymercharakterisierung durch Flüssigkeitschromatographie, Verlag A. Hüthig, Heidelberg, 1982. Measurements are usually carried out in 0.25% strength by weight solution in tetrahydrofuran at 23° C. and at an average flow rate of 1.2 ml/min).

According to the invention, the novel polymers should contain the functional groups of the formula (I) or (II)

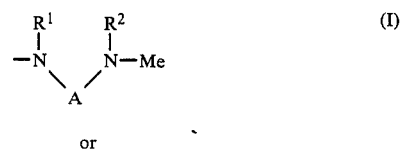

or

-continued

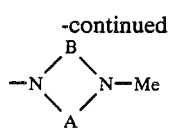 (II)

where N is nitrogen, $R^1$ and $R^2$ are each alkyl or aryl, A is an unsubstituted or substituted one-membered carbon bridge, Me is an alkali metal and B is a 2-membered to 12-membered bridge in which at least the members adjacent to the nitrogen atoms consist of

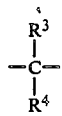

radicals, where $R^3$ and $R^4$ can be identical or different and are each hydrogen, alkyl, cycloalkyl or aryl, and the more remote members can be not only —C($R^3$, $R^4$) radicals but also ether or N-alkyl or arylimino groups. Suitable alkali metals are Li, Na, K, Rb and Cs, in particular Li.

The novel polymers preferably contain on average 1 to 10 of the functional groups (I) or (II) in the macromolecule, ie. based on the sum of all macromolecules, a statistical average of 1 to 10 functional groups should be present per macromolecule.

Other preferred polymers are those in which $R^1$ and $R^2$ are each $C_1$–$C_4$-alkyl, in particular butyl, and the carbon bridge A is the methylene group —$CH_2$— or the dimethylmethylene group —$C(CH_3)_2$, those in which the bridge B consists of three or four unsubstituted or substituted methylene groups, in particular —$CH_2CH_2CH_2$— or —$CH(CH_3)$—$CH_2CH(CH_3)$—, and those in which B consists of two, three or four carbon members, of which one or more is methylene and the other two form part of one or more alicyclic or aromatic ring systems. Examples of groups B which are suitable for this purpose are

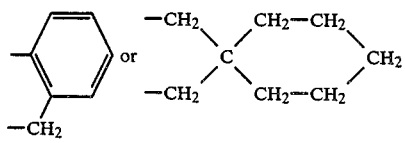

The novel polymers possessing the functional groups (I) or (II) are prepared by a conventional method, either from the living anionically polymerized homopolymers, copolymers and/or block polymers of vinylaromatics and/or dienes or from polymers of this type which are metallized with an alkali metal (cf. the literature cited at the outset and J. M. Malan et al. Chem. Rev. 69 (1969) (5), 693–755). To do this, the monomers are subjected to anionic polymerization at low temperatures in the presence of an alkali metal or its alkyl or aryl derivative, in particular in the presence of an alkyl derivative of lithium, such as sec-butyllithium, in an inert solvent, such as an aliphatic or aromatic hydrocarbon, in particular hexane or cyclohexane, benzene or toluene, or in the presence of tetrahydrofuran. These processes give polymers which contain metals bonded to the terminal groups. However, it is also possible to prepare homopolymers, copolymers and/or block copolymers of vinylaromatics and/or dienes and to carry out metallization subsequently with an alkali metal or one of its derivatives. Such metallized polymers contain the organometallic groups randomly distributed along the chain.

According to the invention, the above organometallic polymers are reacted with hydrazine derivatives of the general formula (III) or (IV)

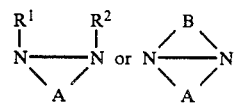

where $R^1$, $R^2$, A and B have the meanings stated at the outset, in the presence of a solvent. Preferred solvents are aliphatic or aromatic hydrocarbons, such as hexane, cyclohexane, benzene, toluene, etc. The reaction is preferably carried out in the absence of water and in an inert atmosphere, eg. under pure nitrogen. In the reaction, the ratio of the number of equivalents of the hydrazine derivative to the number of equivalents of alkali metal is advantageously from 1:1 to 1.5:1. The reaction is carried out at from −70° to 100° C., preferably at from 0° to 60° C. During the reaction with the organometallic groups of the polymers, the N—N bond is cleaved, the polymer radical undergoing addition at one nitrogen and the metal, eg. lithium, at the other nitrogen.

Suitable compounds (III) and (IV) are those in which $R^1$ and $R^2$ are each alkyl or aryl, A is an unsubstituted or substituted one-membered carbon bridge, and B is a 2-membered to 12-membered bridge, of which at least the members adjacent to the N atoms consist of —($CR^3$, $R^4$) radicals, where $R^3$ and $R^4$ can be identical or different and are each hydrogen, alkyl, cycloalkyl or aryl and the more remote members can be not only —($CR^3$, $R^4$) radicals but also ether or N-alkyl or N-arylimino groups.

Preferred radicals $R^1$ and $R^2$ and bridges A and B are disclosed in the subclaims 3, 4 and 5 at the outset in the description. Lithium is the preferred alkali metal.

Examples of suitable hydrazine derivatives of the general formulae (III) and (IV) are:

1,2-Dibutyldiaziridine (a)

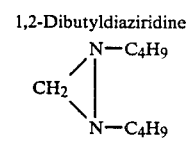

1,5-Diazabicyclo[3.1.0]hexane (b)

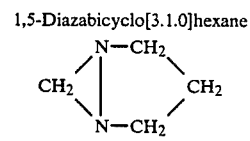

6,6-Dimethyl-1,5-diazabicyclo[3.1.0]hexane (c)

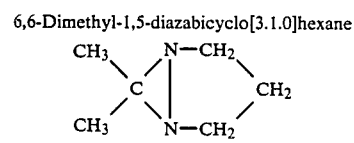

1,2-Dimethyl-3-methyl-3-ethyldiaziridine (d)

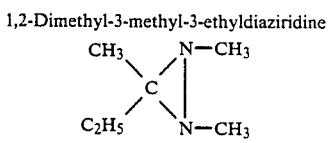

1,2-Dimethyl-1,2-diazaspiro[2,3]octane (e)

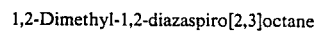

-continued

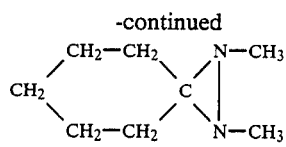

1,2-Dibutyl-3-propyldiaziridine (f)

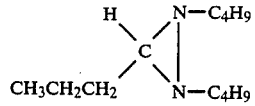

3,6-Dimethyl-1,3,5-triazabicyclo[3.1.0]hexane (g)

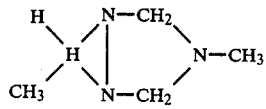

6-Methyl-3-oxa-1,5-diazabicyclo[3.1.0]hexane (h)

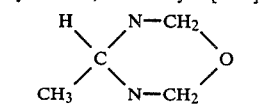

6,6-Pentamethylene-1,5-diazabicyclo[3.1.0]hexane (i)

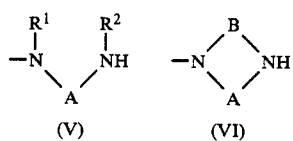

Compound (b) is particularly suitable.

This list is not complete and is not intended to impose any limit. Further individual compounds and the preparation of hydrazine derivatives of this type have been described by, for example, R. Ohme et al., Chem. Ber. 99 (1966), 2104–2109 and by E. Schmitz and K. Schinkowsky, Chem. Ber. 97 (1964), 49.

The reaction with the hydrazine derivatives takes place quantitatively and very rapidly. The fact that they need not be used in excess or may be required in only slight excess is an advantage, since the converted polymers are hardly contaminated by unconverted hydrazine derivatives. The living polymer solutions, which have an intense orange red coloration when the chain end consists of styrene or its substitution products, can, for example, be titrated with the hydrazine derivative until the color vanishes.

The novel polymers possessing the functional groups (I) and (II) have the advantage that they can be used for the preparation of similar polymers containing the functional groups of the general formulae (V) and (VI)

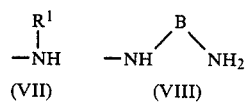

if they are reacted with an amount of water equivalent to the alkali metal, the latter being replaced by hydrogen. This reaction takes place spontaneously when water is added, lithium hydroxide also being formed.

Another advantage of the novel polymers possessing the functional groups (I) and (II) is that they can be converted to the polymers possessing functional groups of the general formulae (VII) and (VIII)

$$\begin{array}{cc} R^1 & B \\ | & / \backslash \\ -NH & -NH \quad NH_2 \end{array}$$
(VII) (VIII)

by means of an excess of water, the bridge A being eliminated.

This reaction too takes place spontaneously in some cases. It is also possible to treat the novel polymers with water-containing acids, eg. concentrated hydrochloric acid or 80% strengths by weight acetic acid, at from 40° to 100° C., the bridge A being eliminated. A polymer possessing primary or secondary amino groups is formed, depending on the hydrazine derivative used:

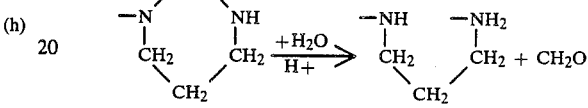

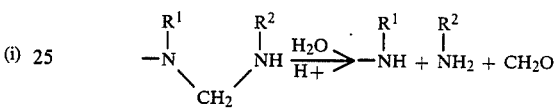

The Examples which follow illustrate the invention.

PREPARATION OF THE HYDRAZINE DERIVATIVES USED

1,5-Diazabicyclo[3.1.0]hexane 37.2 g (½ mole) of 1,3-propylenediamine and 250 cm³ of 2N NaOH are mixed with 50 cm³ of 30% strength by weight formalin solution in a 2 l flask with cooling, in such a way that the temperature does not exceed 5° C. Thereafter, 274 cm³ of chlorine bleach solution (160 g of free chlorine/liter) are mixed in, while stirring very thoroughly, so that the temperature does not exceed 5° C. The solution is evaporated down under reduced pressure at ≦35° C. to about half its original volume, the precipitated salt is filtered off and the mother liquor is extracted exhaustively with 5 times 200 cm³ of methylene chloride. The combined extracts are dried with solid KOH, the methylene chloride is stripped off under reduced pressure at about 35° C. and the 1,5-diazabicyclo[3.1.0]hexane is distilled off under 7 mbar.

B.p. (7 mbar)=47°–52° C.; yield=22.5 g (53.6% of theory).

Content of (in % by weight)

|  | C | H | N |  |
| --- | --- | --- | --- | --- |
| Found | 56.1% | 9.7% | 33.5% |  |
| Theory | 57.4% | 9.52% | 33.33% | for C₄H₈N₂ |

1,2-Dibutyldiaziridine

The method described in Chem. Ber. 99 (1966), 2105 to 2109 is used.

6,6-Dimethyl-1,5-diazabicyclo[3.1.0]hexane 37.2 g (½ mole) of 1,3-propylenediamine and 250 cm³ of 2N NaOH are mixed with 29 g of acetone at 5° C., and 274 cm³ of chlorine bleach solution (160 g of active chlorine/liter) are added dropwise at 5° C., while cooling. The solution is extracted with 3 times 200 cm³ methylene chloride, the extracts are dried with solid KOH, the solvent is expelled so that the temperature in the bottom does not exceed 40° C., and the end product is distilled off under 0.3 mbar.

B.p. (0.3 mbar)=40° C.; yield=38.5 g (69% of theory).

Content of (in % by weight)

|  | C | H | N |  |
|---|---|---|---|---|
| Theory | 64.3% | 10.7% | 25% | for $C_6H_{12}N_2$ |
| Found | 64.1% | 10.9% | 24.9% |  |

6,6-Pentamethylene-1,5-diazabicyclo[3.1.0]hexane

The preparation is carried out using the method employed for 6,6-dimethyl-1,5-diazabicyclo[3.1.0]hexane, except that 49 g (½ mole) of cyclohexanone were used instead of acetone.

B.p. (0.8 mbar)=87°-89° C.; yield=34.9 g (45% of theory).

|  | C | H | N |  |
|---|---|---|---|---|
| Found (% by weight) | 70.5 | 10.7 | 18.6 |  |
| Theory (% by weight) | 71.1 | 10.5 | 18.4 | for $C_9H_{16}N_2$ |

EXAMPLE 1

1000 cm³ of cyclohexane and 104 g (1 mole) of purified styrene are introduced into a 2 liter three-necked flask which has been washed under very pure nitrogen with a solution of sec-butyllithium in cyclohexane, is provided with a stirrer and a thermometer and is closed with a rubber membrane.

A 1.4 molar solution of sec-butyllithium in cyclohexane is introduced into the thoroughly stirred styrene solution at 50° C. with an injection syringe until a permanent pale orange coloration is produced. Immediately thereafter, a further 21 millimoles of sec-butyllithium are added. The solution, which is then intense orange, becomes warmer. After 1 hour at 70° C., polymerization is complete. The solution is titrated with a 50% strength by weight solution of 1,5-diazabicyclo[3.1.0]hexane in toluene, this procedure being carried out through the rubber membrane by means of an injection syringe. When 3.7 cm³ of solution has been added, the orange color vanishes. The polymer is precipitated by pouring the solution into 5 l of ethanol, while stirring thoroughly. The product is filtered off and dried, and the following analytical data are determined for the snow-white polystyrene powder: $\overline{M}_w$=5000, determined by GPC calibrated using a general-purpose polystyrene which has a narrow distribution. $\overline{M}_w/\overline{M}_n$=1.02, where $\overline{M}_n$ is the number average molecular weight, determined by GPC. $\overline{M}_w/\overline{M}_n$ is a measure of the width of the molecular weight distribution.

Basic nitrogen determined by potentiometric titration with perchloric acid in a chlorobenzene/glacial acetic acid mixture: 0.58% by weight. Total nitrogen determined by the Kjeldahl method: 0.6% by weight.

10 g of the polystyrene prepared in this manner are dissolved in 1000 cm³ of toluene, and the solution is kept together with 100 cm³ of 90% strength by weight glacial acetic acid for 2 hours at 90° C. Hydrolysis results in elimination of the methylene bridge. Potentiometric titration gives a basic nitrogen content of 0.5% by weight.

EXAMPLE 2

A polystyrene is prepared in the same manner as in Example 1, except that termination is effected with a 1,2-dibutyldiaziridine. The polymer has the following properties:

$\overline{M}_w$: 5300 (GPC method)
$\overline{M}_w/\overline{M}_n$=1.03
Basic nitrogen: 0.57% by weight
Total nitrogen: 0.6% by weight After hydrolysis with glacial acetic acid/H₂O in toluene, the total nitrogen is found to have decreased to 0.35% by weight, while basic nitrogen is determined as 0.25% by weight.

EXAMPLE 3

1000 cm³ of toluene and 1 mole (104 g) of styrene are introduced, under inert conditions, into a flask which has been cleaned under nitrogen by washing with butyllithium solution and is provided with a stirrer, a thermometer, a dropping funnel and a rubber cap. A fresh solution of 23.0 g of active sodium in 1000 cm³ of tetrahydrofuran and 500 g of α-methylstyrene is prepared by a conventional method, and 28 cm³ of this solution are added rapidly to the above solution at 20° C. from the dropping funnel, while stirring thoroughly. The reaction begins immediately, and the contents of the flask warm up to 57° C. in the course of 1 minute. The virtually black solution is then titrated with a 50% strength by weight solution of 1,5-diazabicyclo[3.1.0]hexane in toluene through the rubber membrane using an injection syringe, until the color vanishes. 4.7 cm³ (28 millimoles) of 1,5-diazabicyclo[3.1.0]hexane solution are required. The following analytical data are obtained for the polymer.

$\overline{M}_w$ from GPC: 7600
$\overline{M}_w/\overline{M}_n$=1.2
Total nitrogen by the Kjeldahl method: 0.8% by weight
Basic nitrogen by potentiometric titration: 0.7% by weight.

The analytical data show that a polystyrene possessing a total of 4 amino groups at both ends has been formed.

EXAMPLE 4

In order to prepare a 2-block copolymer consisting of 17% by weight of styrene and 83% by weight of butadiene and possessing terminal diamino groups, a 6 l reactor provided with a stirrer, a thermometer, a reflux condenser, a rubber membrane and a heating jacket is cleaned by boiling cyclohexane containing 2 cm³ of sec-butyllithium in the reactor under very pure nitrogen. After this solution has been discharged, the reactor is charged with 3000 cm³ of cyclohexane and 0.9 mole (93.6 g) of styrene. A solution of sec-butyllithium is metered in with the aid of an injection syringe at 40° C. until a pale orange coloration indicates that all impurities have been consumed. Thereafter, 12 millimoles of sec-butyllithium are added and polymerization of the styrene is completed in the couse of 1 hour at 65° C. 10.2 moles of butadiene which has been purified by distilling off butyllithium are then run in a little at a time at this temperature. 1 hour after the feed has ended, 2 cm³ of styrene are added using a syringe. The solution, which is virtually colorless during the polymerization of the butadiene, becomes orange after a further hour at 65° C. The solution is then titrated by adding 1,5-diazabicyclo[3.1.0]hexane (50% strength by weight solution in toluene) from a calibrated injection syringe until the color vanishes. 1.85 cm³ (11 millimoles or 0.924 g) of the solution are required.

An $\overline{M}_w$ of 55,000 is determined by GPC. The nitrogen content determined by the Kjeldahl method is 0.047% by weight (theoretical content 0.051).

EXAMPLE 5

In the apparatus described in Example 4, 540 g of isoprene (purified over Ca hydride) are polymerized with about 8 millimoles of sec-butyllithium in 3000 cm³ of cyclohexane. When the polymerization is complete, 2 cm³ of styrene are added. After a further hour, the solution is titrated with 1.68 cm³ of a 50% strength by weight 1,5-diazabicyclo[3.1.0]hexane solution until the color vanishes. Molecular weight $\overline{M}_w$ of the polyisoprene, determined by GPC: 60,000

Nitrogen content by the Kjeldahl method: 0.05% by weight (theoretical content 0.047% by weight)

I claim:

1. A homopolymer, copolymer or block copolymer obtained from a vinylaromatic and/or a diene, and modified with functional amino groups, which contains functional groups of the formula (I) or (II)

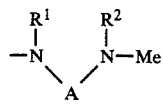   (I)

or

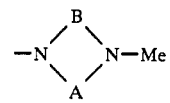   (II)

where N is nitrogen, $R^1$ and $R^2$ are each alkyl or aryl, A is an unsubstituted or substituted one-membered carbon bridge, Me is an alkali metal and B is a 2-membered to 12-membered bridge in which at least the members adjacent to the nitrogen atoms consist of $-C(R^3, R^4)$ radicals, where $R^3$ and $R^4$ can be identical or different and are each hydrogen, alkyl, cycloalkyl or aryl, and the more remote members can be not only $-C(R^3, R^4)$ radicals but also ether or N-alkyl- or N-arylimino groups.

2. A polymer as defined in claim 1, which contains on average from 1 to 10 of the functional groups (I) or (III) per macromolecule.

3. A polymer as defined in claim 1, wherein $R^1$ and $R^2$ are each $C_1$–$C_4$-alkyl and A is a methylene or dimethylmethylene bridge.

4. A polymer as defined in claim 1, wherein B is a bridge composed of three or four unsubstituted or alkyl-substituted methylene groups.

5. A polymer as defined in claim 1, wherein B consists of 2, 3 or 4 carbon members, one or more of which is methylene and the other two form part of one or more alicyclic or aromatic ring systems.

6. A polymer as defined in claim 1, wherein the polymer contains functional amino groups of the formula (II).

* * * * *

UNITED STATES PATENT AND TRADEMARK OFFICE
CERTIFICATE OF CORRECTION

PATENT NO. : 4,753,991
DATED     : June 28, 1988
INVENTOR(S) : Klaus BRONSTERT

It is certified that error appears in the above-identified patent and that said Letters Patent is hereby corrected as shown below:

Column 10, line 19, "groups(I) or (III)" should be

--groups(I) or (II)--

Add foreign application priority data.

August 3, 1985 [DE] Fed. Rep. of Germany 35 27 909.5

Signed and Sealed this

Eighth Day of November, 1988

Attest:

DONALD J. QUIGG

Attesting Officer

Commissioner of Patents and Trademarks